United States Patent [19]

Steffel

[11] Patent Number: 5,013,010

[45] Date of Patent: May 7, 1991

[54] APPARATUS FOR SPREADING APART VEHICLE TYRES IN THE BEAD REGION

[75] Inventor: Horst Steffel, Gross Grönau, Fed. Rep. of Germany

[73] Assignee: Spezialmaschinenbau Steffel GmbH & Co. KG, Ratzeburg, Fed. Rep. of Germany

[21] Appl. No.: 337,332

[22] Filed: Dec. 22, 1989

[30] Foreign Application Priority Data

Jan. 7, 1989 [EP] European Pat. Off. ........ 89100242.0

[51] Int. Cl.⁵ .................... G01M 17/02; B60C 25/14
[52] U.S. Cl. .................................... 254/50.2; 254/50.3
[58] Field of Search ............................ 254/50.1–50.4; 157/1

[56] References Cited

U.S. PATENT DOCUMENTS

| | | | |
|---|---|---|---|
| 2,895,711 | 7/1959 | Branich | 254/50.3 |
| 2,939,678 | 6/1960 | Branick | 254/50.3 |
| 4,293,120 | 10/1981 | Robins | 254/50.2 |

FOREIGN PATENT DOCUMENTS

| | | |
|---|---|---|
| 3103342-A1 | 8/1982 | Fed. Rep. of Germany . |
| 2325240-C2 | 8/1983 | Fed. Rep. of Germany . |
| 1005281 | 6/1947 | France .............................. 254/50.3 |

Primary Examiner—Robert C. Watson
Attorney, Agent, or Firm—Vidas & Arrett

[57] ABSTRACT

Apparatus for spreading apart vehicle tires in the bead region, in particular for visual inspection of the inner and outer wall of the tires and for removing heat flashes, in which in a machine frame a receiving means is provided which receives a tire rotatably mounted and comprises at least one spreading element which grips the bead and pulls the latter outwardly and in which a drive means turns the tire in the receiving means, wherein at least three parallel rollers are rotatably mounted on a bearing component which by means of a first adjusting means is mounted adjustably in the axial direction of the rollers, the rollers with a collar engage behind the bead of the tire and on adjustment of the bearing component press the associated tire flank against a rotary drive means in such a manner that the tire is spread apart and is rotated about the stationarily held rollers.

19 Claims, 4 Drawing Sheets

APPARATUS FOR SPREADING APART VEHICLE TYRES IN THE BEAD REGION

The invention relates to an apparatus for spreading apart vehicle tires in the bead region, in particular for visual inspection of the inner wall of the tire.

In the manufacture of vehicle tires a number of different inspections is made on the finished product. One of these consists of inspecting the inner and outer walls visually, for example to see if they are fully vulcanized, have hair cracks or such like. In addition, at this stage of the inspection possible heat flashes are removed. To be able to look into the interior of the tire it has to be spread apart accordingly in the bead region. For this purpose various spreading apparatuses are known.

In a known spreading apparatus the tire is gripped by two spreading roller pairs in the bead region, spread and pressed against drive rollers. During the inspection the drive rollers set the tires to be inspected in motion. In this known apparatus the tread of the tire faces the operator. Such a spreading means entails some disadvantages. Since the working height has to be adjusted to the visual angle of the tire flank, it is necessary to lift the tire and place it in the spreading means. The operator must therefore lift many tires daily by hand (for example more than 1,000 tires per shift) and take them out of the apparatus again. To generate an entraining force on the drive unit, in the known apparatus the tire is pressed against the drive rollers by the spreading means. The drive must therefore overcome not only diverse roller resistances but also the spreading resistance. Small tires and tires which are soft in the belt or flank bulge thereby and are entrained poorly, jerkingly or, depending on the tire, not at all. On pressing against the drive unit the tire is forced to bulge outwardly due to its contour. This hinders the inner inspection and makes determination of bonding faults in the tire flank difficult. The known apparatus also does not permit the determination of the end of a tire revolution or of the inspection operation. Furthermore, the operator has to change his observation position several times. Finally the spread region of the tire is very small, and consequently a proper inspection is only possible at a low speed of rotation.

In another known spreading apparatus a tire is centrally clamped and spread. On doing so the flank faces the operator (so-called wall mounting). Such an apparatus also comprises several disadvantages.

The tire has to be turned by hand on the inspection apparatuses for the second flank inspection. This method is strenuous and difficult, especially with heavy tires and tires with a large outer diameter. The clamping means turn with the tire and in doing so conceal parts of the tire bead region, making inspection of these areas impossible. In addition, the danger exists of an accident occurring when the tire is placed on the clamping and spreading means by hand. Moreover, the spreading operation takes place only at individual points and not over the entire periphery, which impairs the regularity of the inspection and the inspection speed. In addition no pressing-in of the flanks from the outside, i.e. not in all areas, takes place so that the visual and inspection possibilities are limited.

The invention is based on the problem of providing an apparatus for spreading apart vehicle tires which permits a substantially unrestricted inner inspection of the entire periphery at a relatively fast inspection speed.

This problem is solved by the features of the characterizing clause of claim 1.

In the apparatus according to the invention the work of spreading apart is done by at least three rollers which with a collar engage behind the rear bead of a tire. Although the rollers are rotatably mounted on a bearing component, they are stationary with respect to the rotating tire. The spreading rollers press the tire against a rotary drive means which sets the tire in rotation by gripping the associated flank. The rotary drive means preferably comprises an annular surface against which the tire surface is pressed. A conical form of the annular surface with an inclination directed away from the rollers is particularly advantageous. In particular the conical surface prevents the tire flanks from being pressed in on spreading.

The spreading rollers are preferably conical and taper towards the free end of the rollers on which the collar is also disposed.

The bearing component holding the rollers is axially adjustable so that the collar of the spreading rollers can take hold of the bead and press it outwardly. Moreover, the rollers are preferably also adjustable transversely of their axis so that a tire can be placed on the rollers with the rear bead extending over the collars. Preferably, the spreading rollers are jointly adjustable with the aid of a second adjusting means. A solution according to a further development of the invention resides in that on the shaft of the bearing component a bush is rotatably mounted which comprises a radial portion to which a first pivot lever is articulately connected. At the end of the first pivot lever a second pivot lever is articulately connected which in turn is non-rotatably connected with one end to a pivot pin. Mounted on the pivot pin is a pivot arm on each of which a spreading roller is rotatably mounted. If the bearing bush is now turned, a joint pivoting of all the spreading rollers takes place in order to bring the spreading rollers into or out of engagement with a tire. A particularly favourable inspection position is attained in the apparatus according to the invention if the engagement or annular surface is inclined to the horizontal, for example at an angle of about 30° with respect to the vertical. Such an inclined arrangement also permits removal of a tire from the spreading apparatus in simple manner. For this purpose for example an ejection pin is adjustably mounted in the annular surface and using a power means can be moved to a position projecting beyond the annular surface. The arrangement is such that at the beginning and end of the inspection the ejection pin lies at the top. If a slight unspreading is effected at the end of the inspection, the ejection pin can push the upper part of the tire with its bead over the collar and bring the tire into an approximately vertical position so that it can now drop down in unrestricted manner and can be transported away. The ejection pin can for example be acted upon by a spring which tries to press it out over the engagement surface. Alternatively an adjusting cylinder can also be used to actuate the ejection pin.

To relieve the operator it is of course advantageous to carry out the insertion and removal of a tire into or from the spreading apparatus automatically. For this purpose a development of the invention provides a feed means in which a tire can be centrally received. A gripping means is adjustable between the feed and receiving means and transports a tire from the feed means to the receiving means. For centering, preferably an inclined feed surface in the receiving means is provided which comprises two spaced centering stops, preferably centering rollers. Since of course tires have different diameters, an adjustable arrangement of the centering stops is advantageous. An exact centering would however be relatively involved. It may therefore be sufficient if the centering stops are mounted on a spring and a displacement of the stops according to the weight of the tire takes place. Since a tire with a larger diameter normally also has a greater weight, an approximately evenly centered arrangement of the tire in the feed means is thereby achieved.

The gripping means preferably comprises two roller pairs which engage the periphery of the tire in the feed means at diametrically opposite sides to then move it towards the receiving means. To perform a gripping movement the gripping rollers must be movable towards and away from each other. According to a further development of the invention the gripping means therefore comprises two arms which on the one hand are each separately pivotable and on the other can be jointly pivoted about a further axis. In addition the gripping means provides a possible rotation of the gripping rollers to turn the tire through 180° after examination of the interior of the first tire flank and introduce it into the feed means again so that the opposite inner flank can be inspected. Preferably only one roller pair is adjustable with the aid of a suitable rotary drive disposed on an arm of the gripping means, while the other roller pair can rotate freely therewith. A locking means associated with the second roller pair ensures that an assumed position is maintained.

Tires are of course different in width. In order for the tires to attain a uniform resting position at the rear side, after removal from the feed means the tire is preferably firstly turned in such a manner that its free side in the receiving means becomes the engagement side in the inspection position. Obviously, the tire is first unspread before it can be turned through 180° and brought into the second inspection position.

The invention will be explained in detail hereinafter with the aid of a diagrammatically illustrated example of embodiment.

Figure 1:
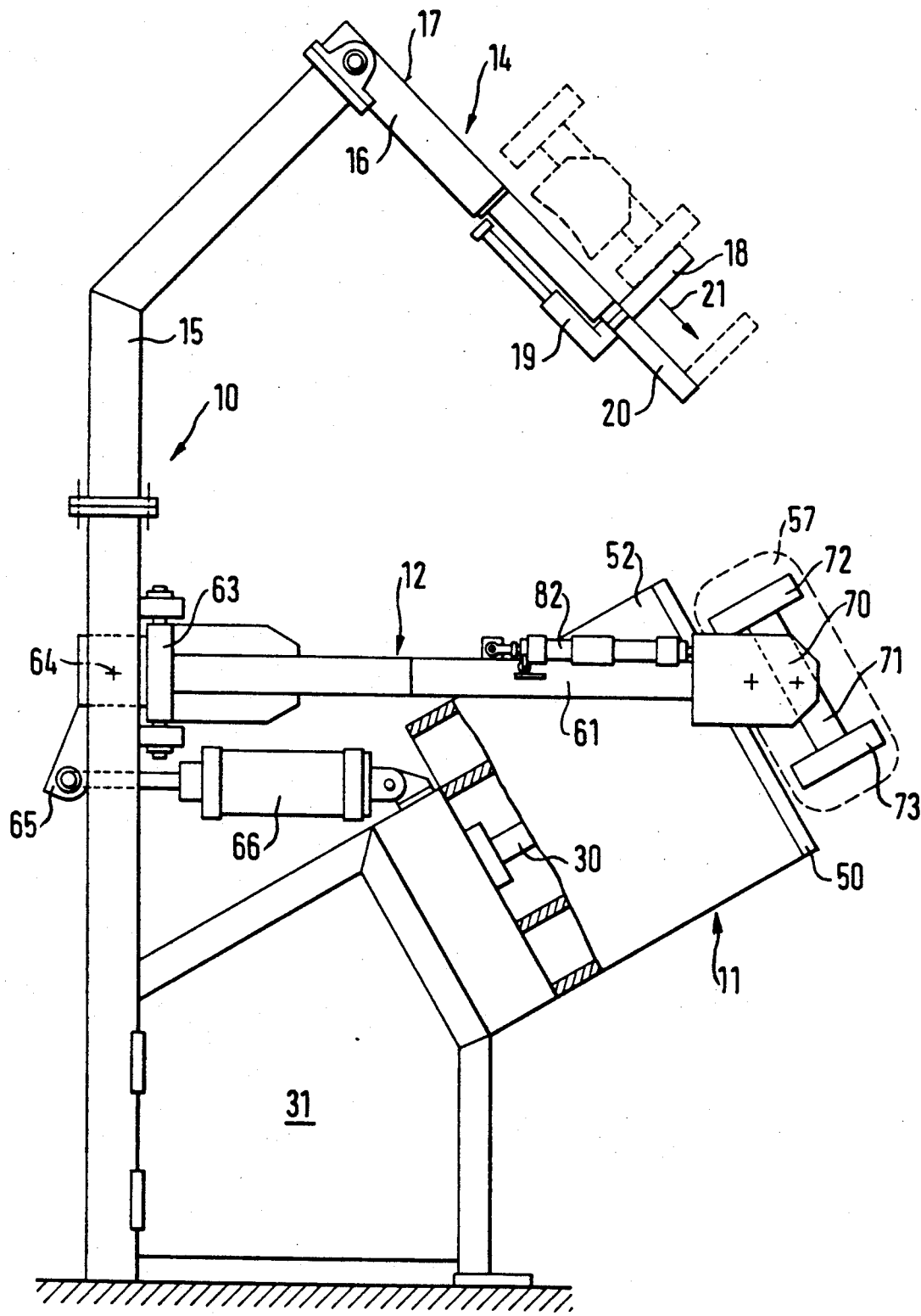
FIG. 1 shows schematically an apparatus according to the invention in side view.

A machine frame 10 holds a spreading apparatus 11, a gripping means 12 as well as a feed means 14. The feed means 14 is situated at the upper inclined end of two parallel supports of the frame 10, one of which can be seen in FIG. 1 at 15. The supports 15 hold a mounting section 16 inclined to the horizontal with a mounting surface 17 extending substantially in a plane. Two rotatably mounted rollers, one of which is illustrated at 18, are mounted with one axis approximately vertically to the mounting surface 17 rotatably above said mounting surface 17. The rotation shafts of the rollers 18 are connected to a spring arrangement 19 and are also displaceable in a slot 20 of the mounting section 16. They can therefore be displaced in the direction of the arrow 21 by pressure on the rollers 18 and for example take up the position shown in dashed line, whereby the position is dependent on the weight of a tire which is placed on the mounting surface 17, for example by a suitable transport means. By means of the spaced rollers 18 a first alignment of an inserted tire takes place, and with the aid of the spring arrangement 19 a further approximate orientation takes place such that depending on its weight and size the tire takes up an approximately centered position on the mounting surface 17.

Figure 4:
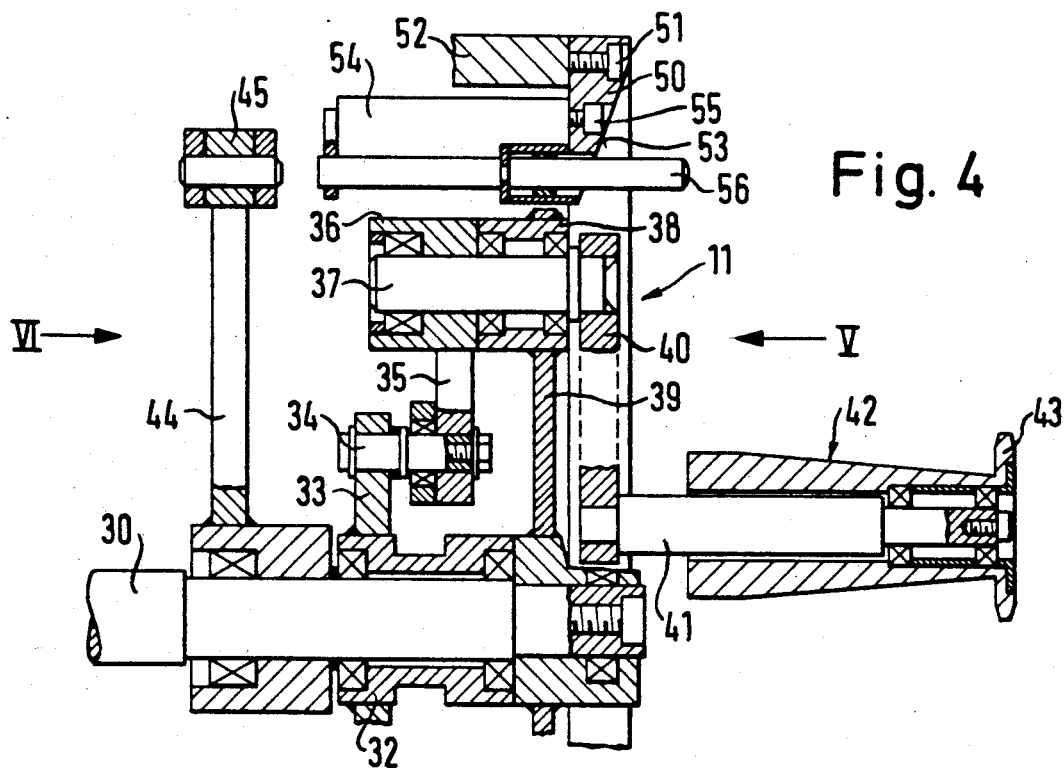
FIG. 4 shows a section through a part of the spreading apparatus according to FIG. 1.
Figure 5:
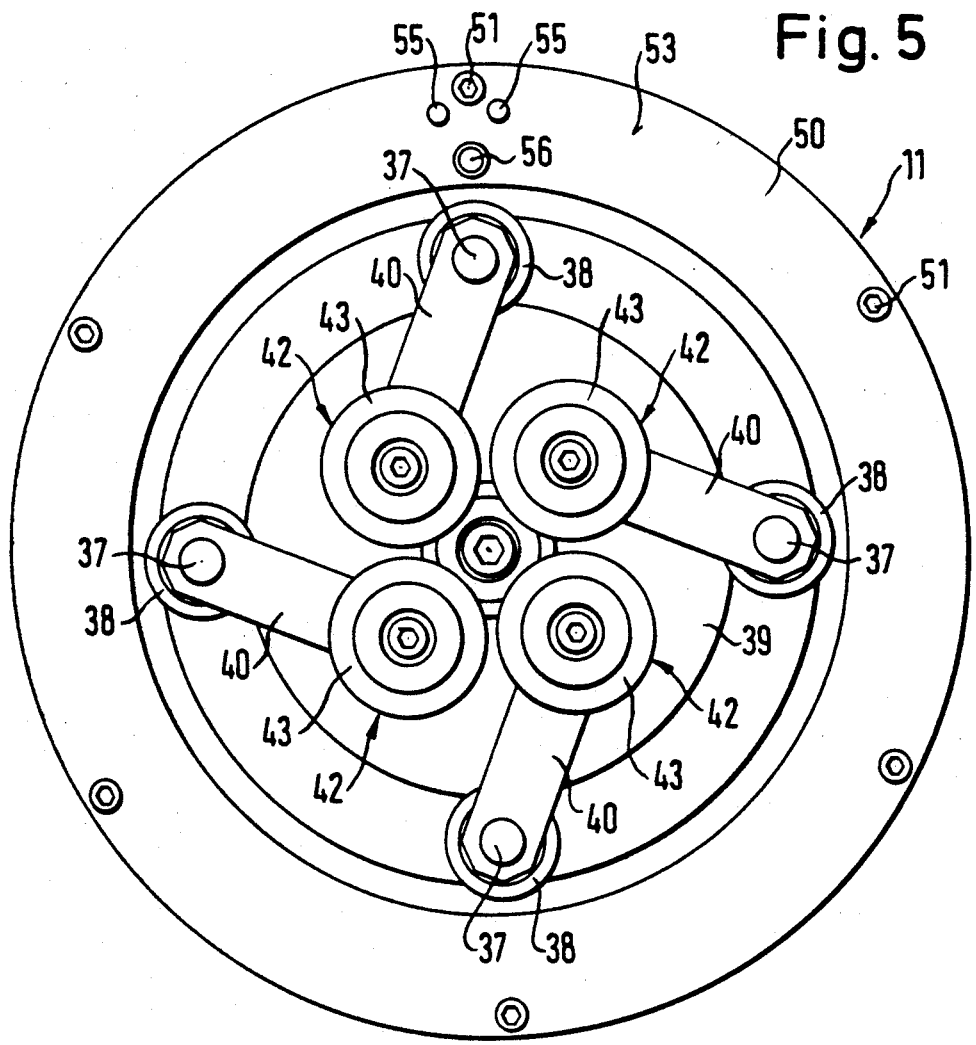
FIG. 5 shows a view of the spreading apparatus according to FIG. 4 in the direction of the arrow 5.
Figure 6:
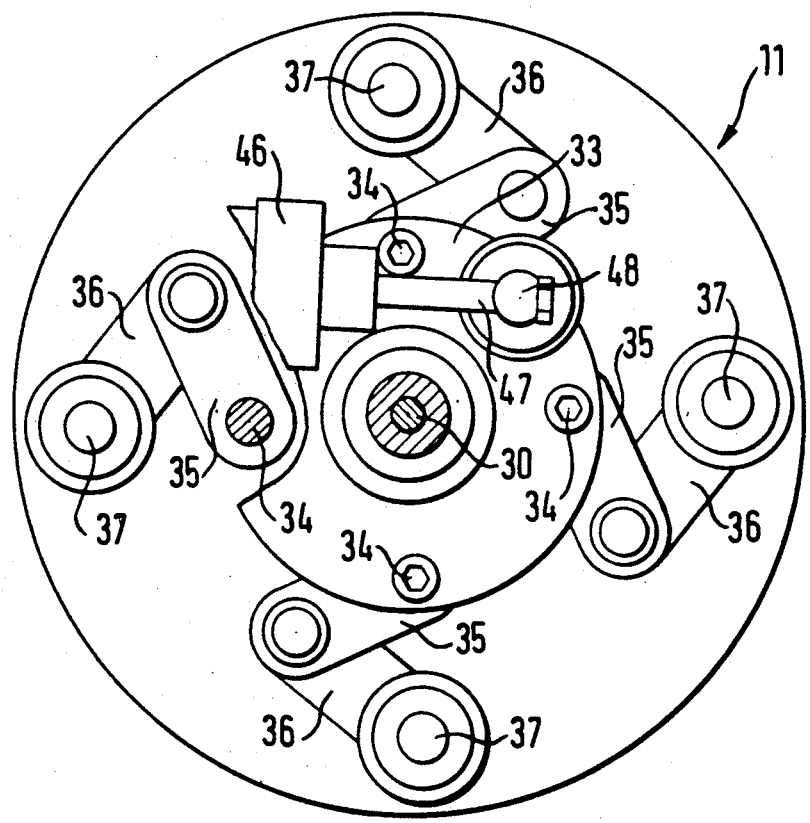
FIG. 6 shows a view of the apparatus according to FIG. 4 in the direction of the arrow 6.

The spreading apparatus 11 is shown in detail in FIGS. 4 to 6. The spreading apparatus 11 comprises a shaft 30 which is mounted non-rotatably but axially displaceable in a holding means 31 for the spreading apparatus 11 and is adjustable with the aid of an adjustment cylinder, not shown. On the shaft 30 an axially fixed bush 32 is rotatably mounted by means of ball bearings. A disc 33 is non-rotatably disposed on the periphery of the bush 32. Four bolts 34 are secured in a corresponding hole of the disc 33 at angular intervals of 90°. Pivotally mounted on each bush 34 is a lever 35 which is articulately connected to a further lever 36 (cf. FIG. 6). The other end of the lever 36 is non-rotatably mounted on a pivot pin 37 which is rotatably mounted in a bearing 38. The bearing 38 is fixedly connected to the shaft 30 by means of a radial plate 39. Mounted on the pivot pin 37 is a pivot lever 40 on whose lower end a pivot pin 41 is connected projecting at right angles. It rotationally bears a roller 42 whose periphery conically tapers towards the free end. At the free end it comprises a radial collar 43.

A radial arm 44 is fixedly connected to the shaft 30 by means of a bush clamped-on on the shaft 30. In FIG. 4 this arm is shown turned through 90°. In reality it extends rearwardly vertically to the plane of the drawing. At the outer end of the arm an articulated connection 45 for an adjusting cylinder 46 (FIG. 6) is disposed. The adjusting rod 47 of the cylinder is articulately connected to the disc 33 via a transverse bolt 48. On actuation of the cylinder 46 the disc 33 is consequently turned through a certain angle about the axis 30. Via the described lever connection a pivoting of the pivot arms 40 takes place and thus also of the rollers 42 to hold the rollers in readiness to receive a tire and after reception of the tire to spread the latter with the rear bead. The axial movement of the shaft 30 then leads to engagement of the collars 43 of the rollers 42 with the bead.

A ring 50 is connected by means of screws 41 to a cylindrical body 52 which with the aid of a rotational means, not shown, can be set in rotation. The ring 50 comprises a conical annular surface 53 whose inclination extends downwardly away from the rollers 42. On the described spreading of the tire with the aid of the rollers 42 the tire wall is placed against the annular surface 43.

An ejection pin 56 is displaceably mounted in a bearing component 54 which with the aid of screws 55 is mounted on the rear of the ring 50. By means of a spring, not illustrated, the ejection pin 56 is biased so that when not under load it projects beyond the engagement surface 53. If a tire is pressed against the engagement surface 53 the ejection pin 56 retracts. If on the other hand spreading is reduced, the spring presses the ejection pin 56 outwardly and thus the tire beyond the respective upper rollers 42 or their collars so that the tire moves from the inclined position indicated by 57 in FIG. 1 and into an approximately vertical one, and thus automatically drops down. Separate removal of the tire from the spreading apparatus 11 is therefore not necessary.

Figure 2:
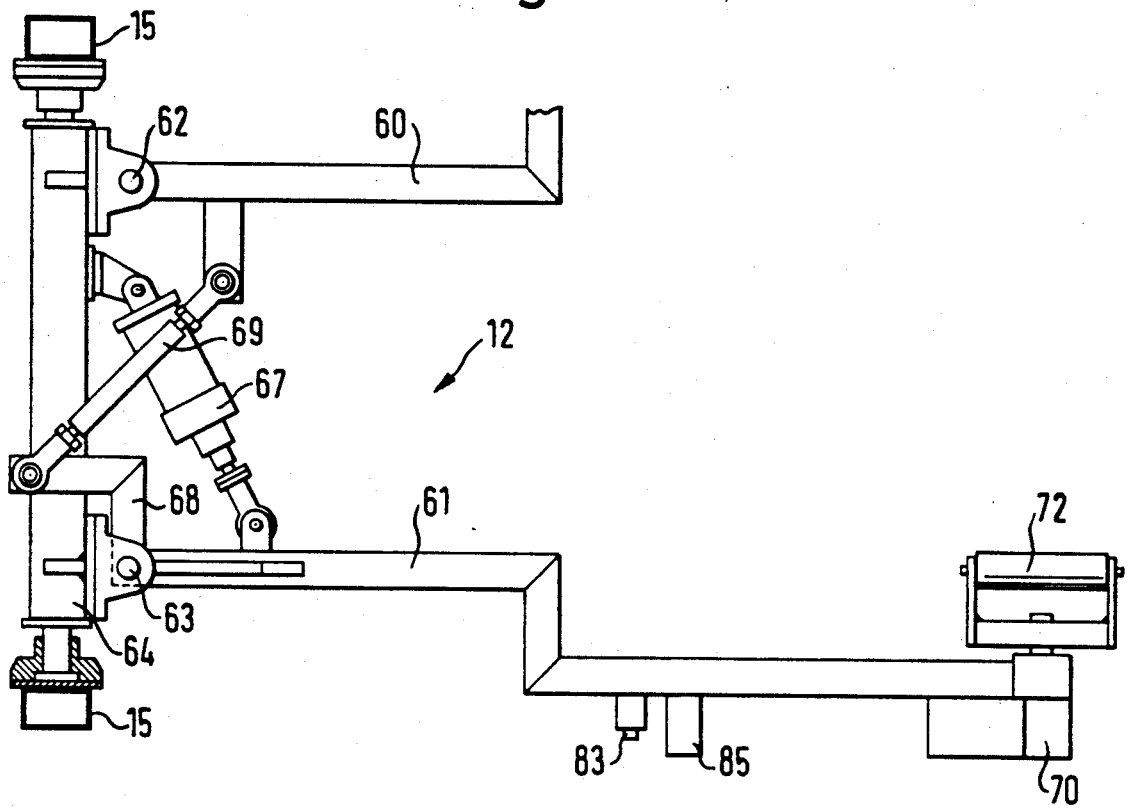
FIG. 2 shows a plan view of a gripping means of the apparatus according to FIG. 1.
Figure 3:
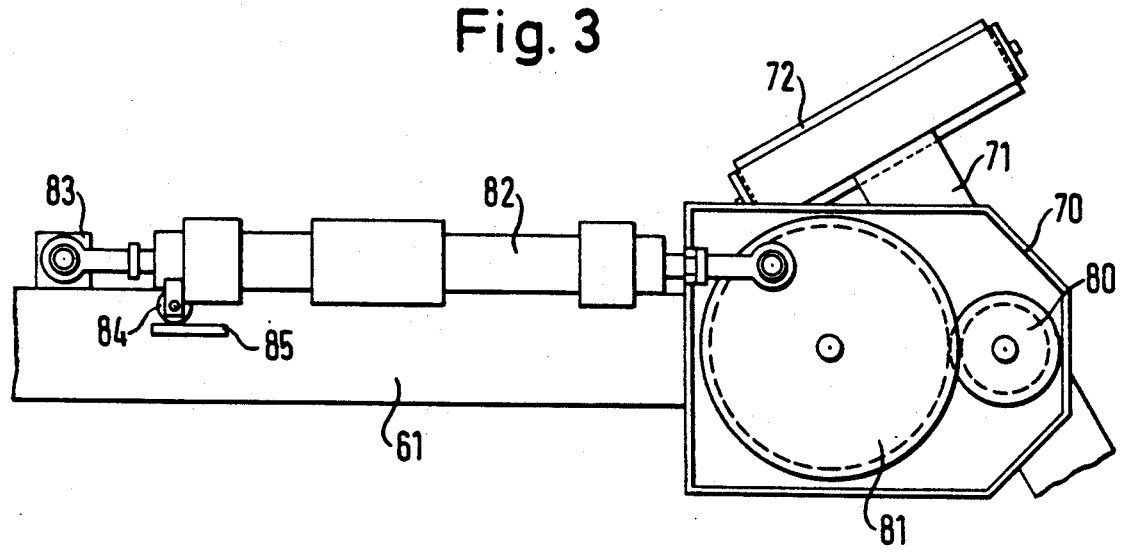
FIG. 3 shows a detail of the gripping means according to FIG. 2.

The gripping means 12, with which a tire is transported from the feed means 14 to the spreading apparatus 11, is shown in detail in FIGS. 1 to 3. It comprises two arms 60, 61 which are articulately connected at 62, 63 to a shaft 64 between the supports 15. Pivoting of the arms 60, 61 takes place about an axis perpendicularly to the arms 60, 61. The shaft 64 is pivotable about a horizontal axis. For this purpose on the shaft an arm 65 is mounted (FIG. 1) on which the adjusting rod of an adjusting cylinder 66 engages which is articulately connected to the holder 31. With the aid of the adjusting cylinder 66 the arms 60, 61 can therefore be pivoted about a horizontal axis. An adjusting cylinder 67 is hinged to the shaft 64 as well as an arm 61. In addition, at the articulate connection between the arm 60 and an angled extension 68 of the arm 61 beyond the fulcrum 63 a connection piece 69 is articulately connected, the length of which is adjustable. On actuation of the cylinder 67 the arms 60, 61 are thus pivoted towards or away from each other.

Each arm 60, 61 comprises at its free end a head, of which only the one head 70 is to be seen in the Figures. The head 70 bears one pair of rollers 72, 73 which engage in spaced manner at the periphery of a tire 57 (FIG. 1). By means of the roller pairs at the arms 60, 61 a tire centrally located in the feed means 14 can thus be centrally engaged and moved towards the spreading means, to move it over the spreading rollers 42 against the engagement surface 53.

The roller pairs are rotatable in the heads 70 about an axis transversely of the arms 60 and 61. For this purpose a gear 80 is located on the axis of rotation (FIG. 3) and meshes with a larger gear 81 which is rotatably mounted on the arm 61 and at which an adjusting cylinder 82 articulately engages which in turn is connected to the arm 61 at 83. The adjusting cylinder 83 is provided with a roller 84 which rests on a guide plate 85. If the adjusting cylinder 82 is actuated the associated roller pair is pivoted. A tire taken up between the roller pairs 72 can thus be turned. This is necessary to reach the second inspection position from the first, as shown in FIG. 1, in which the tire is turned through 180° so that the second flank comes to lie against the annular surface 53. So that a constant spacing is always maintained with tires of different thickness with respect to the annular surface 53, a tire engaged in the feeding means 14 is first so turned on transport to the spreading apparatus 11 that the free side in the feed means becomes the engagement side in the receiving means. After completion of the first inspection passage, i.e. after turning the tire with the aid of the ring 50 through 360°, the tire is again engaged by the gripping means 12. At the same time, or shortly after, an unspreading takes place in the manner described so that the gripping means can turn the tire through 180° with the aid of the roller pairs and the described rotary drive means and bring it into the inspection position again. The rotary drive means according to FIG. 3 actuates only one roller pair. The roller pair on the other arm 60 turns freely therewith. However, so that the rotary position taken up is maintained, the head 70 of the arm 60 is provided with a locking means, not shown.

In front of the annular surface 53 a preferably cylindrical, freely rotatably mounted roller, not illustrated, can be pivoted against which the tire bears in this area of the ring 50. Such a roller serves to press the tire in locally, thus providing a particular inspection possibility, for example to ascertain if hair cracks are present.

What is claimed is:

1. Apparatus for spreading apart vehicle tires in the bead region, in which in a machine frame a receiving means is provided which receives a tire rotatably mounted and comprises at least one spreading element which grips the bead and pulls the latter outwardly and in which a drive means turns the tire in the receiving means, characterized in that the drive means is a rotary drive means (50) comprising an annular surface (53) against which the tire flank is pressed, at least three parallel rollers (42) are rotatably mounted on a bearing component (30) which by means of a first adjusting means is mounted adjustably in the axial direction of the rollers (42), the rollers (42) being stationarily held relative to the rotation of the rotary drive means (50,53), each roller (42) having a collar (43) adapted to engage the tire behind the bead thereof and on adjustment of the bearing component (30) press the associated tire flank against the rotary drive means (50,53) in such a manner that the tire is spread apart and is rotated about the stationarily held rollers (42).

2. Apparatus according to claim 1, characterized in that the annular surface (53) is conical with an inclination directed away from the rollers (42).

3. Apparatus according to claim 1, characterized in that the rollers (42) by means of a second adjusting means (46) are adjustable transversely of their axes.

4. Apparatus according to claim 3, characterized in that the rollers (42) are mounted at the end of pivot arms (40), the pivot arms (40) are each mounted on a pivot pin (37), each pivot pin (37) is connected to the bearing component (30) and pivotable about a stationary axis, and pivot drive means engaging each pivot pin (37) for pivoting each pivot pin about its stationary axis.

5. Apparatus according to claim 4, characterized in that the bearing component comprises a shaft (30) on which a bush (32) is rotatably mounted, on a radial portion (33) of the bush (32) a first pivot lever (35) is articulately connected which is articulately connected at the other end to a second pivot lever (36) which in turn at the other end is non-rotatably connected to the pivot pin (37) and the pivot drive engages the bearing bush (32).

6. Apparatus according to claim 5, characterized in that an adjusting cylinder (46) is articulately connected to a cantilever arm (44) which projects radially from the shaft (30) and is fixedly connected to the latter.

7. Apparatus according to claim 1, characterized in that the annular surface (53) is inclined with respect to the vertical.

8. Apparatus according to claim 7, characterized in that an ejection pin (56) is mounted in the drive means 50, said ejection pin being movable between a position below the annular surface (53) and a position extending beyond the annular surface (53) and by means of a power means is moved to the position extending beyond the annular surface (53).

9. Apparatus according to claim 1, characterized in that associated with the receiving means is a feed means (14) which comprises centering means (18) for centered arrangement of the tire to be investigated spaced from the receiving means, a transfer means (12) which comprises a gripping means (72) and which transports a tire from the feed means (14) to the receiving means and the gripping means is mounted rotatably about an axis for the purpose of turning the gripped tire through 180° in order to turn the other tire flank towards the observer.

10. Apparatus according to claim 9, characterized in that the feed means (14) comprises an inclined feed surface (17) with which two spaced centering stops are associated.

11. Apparatus according to claim 10, characterized in that the centering stops (18) are mounted displaceably in the plane of the feed surface (17) and are held by a tension spring arrangement (19).

12. Apparatus according to claim 9, characterized in that the gripping means comprises two roller pairs (72) which at diametrically opposite sides engage the periphery of the tire and the roller pairs (72) are movable towards and away from each other by means of a third adjusting means (67).

13. Apparatus according to claim 9, characterized in that the gripping means (12) comprises two arms (60, 61) which are mounted jointly pivotally about an axis and by means of a fourth adjusting means (66) are pivotal to pivot the gripping means between the feed means (14) and the receiving means (11).

14. Apparatus according to claim 12, characterized in that the third adjusting means (67) is arranged between the arms (60, 61) which are mounted separately pivotal.

15. Apparatus according to claim 12 characterized in that a shaft connecting the rollers of a first of said two roller pairs is mounted pivotally by a rotary shaft and the rotary shaft is coupled via a gearing (80,81) to a fifth adjusting means (82).

16. Apparatus according to claim 15, characterized in that the locking means is associated with the rotary shaft of the second of said two roller pairs.

17. Apparatus according to claim 9, characterized in that the gripping means firstly turns the tire received from the feed means (14) to such an extent that the flank which is free in the feed means is brought into engagement in the receiving means.

18. Apparatus according to claim 1, characterized in that the collar (43) is disposed in the end region of the rollers (42) and the rollers (42) are conical and taper toward the collar (43).

19. Apparatus for spreading apart vehicle tires in the bead region, in which in a machine frame a receiving means is provided which receives a tire rotatably mounted and comprises at least one spreading element which grips the bead and pulls the latter outwardly and in which a drive means turns the tire in the receiving means, characterized in that the drive means is a rotary drive means (50) comprising a annular surface (53) against which the tire flank is pressed, at least three parallel rollers (42) are rotatably mounted on a bearing component (30) which by means of a first adjusting means is mounted adjustable in the axial direction of the rollers (42), the annular surface (53) being conical and having an inclination directed away from the rollers (42) the rollers (42) being stationarily held relative to the rotation of the rotary drive means (50,53) and jointly adjustably transversely of their axes, each roller (42) having a collar (43) adapted to engage the tire behind the bead thereof and on adjustment of the bearing component (30) press the associated tire flank against the rotary drive means (50,53) in such a manner that the tire is spread apart and is rotated about the stationarily held rollers (42).

* * * * *